United States Patent
Keennon et al.

(10) Patent No.: US 10,329,025 B2
(45) Date of Patent: *Jun. 25, 2019

(54) INVERTIBLE AIRCRAFT

(71) Applicant: AeroVironment, Inc., Simi Valley, CA (US)

(72) Inventors: Matthew Todd Keennon, Simi Valley, CA (US); Karl Robert Klingebiel, Simi Valley, CA (US)

(73) Assignee: AeroVironment, Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,342

(22) Filed: May 12, 2017

(65) Prior Publication Data

US 2017/0240289 A1    Aug. 24, 2017

Related U.S. Application Data

(60) Continuation of application No. 14/885,972, filed on Oct. 16, 2015, now Pat. No. 9,650,135, which is a
(Continued)

(51) Int. Cl.
*B64D 31/06* (2006.01)
*B64C 27/12* (2006.01)
(Continued)

(52) U.S. Cl.
CPC .............. *B64D 31/06* (2013.01); *B64C 11/20* (2013.01); *B64C 11/32* (2013.01); *B64C 27/04* (2013.01); *B64C 27/06* (2013.01); *B64C 27/08* (2013.01); *B64C 27/12* (2013.01); *B64C 27/473* (2013.01); *B64C 27/59* (2013.01);

*B64C 29/0033* (2013.01); *B64C 39/02* (2013.01); *B64C 39/024* (2013.01); *B64C 39/028* (2013.01);
(Continued)

(58) Field of Classification Search
None
See application file for complete search history.

(56) References Cited

U.S. PATENT DOCUMENTS 1,703,621 A   2/1929   Haworth
2,365,357 A   12/1944  Prewitt
(Continued)

OTHER PUBLICATIONS

"International Search Report and Written Opinion of the International Search Authority" in related priority PCT Application No. PCT/US2012/000160, dated Jun. 13, 2012, performed by the ISA/US.

*Primary Examiner* — Medhat Badawi

(74) *Attorney, Agent, or Firm* — Eric Aagaard; John Griecci

(57) ABSTRACT

A rotorcraft including a fuselage, one or more motor-driven rotors for vertical flight, and a control system. The motors drive the one or more rotors in either of two directions of rotation to provide for flight in either an upright or an inverted orientation. An orientation sensor is used to control the primary direction of thrust, and operational instructions and gathered information are automatically adapted based on the orientation of the fuselage with respect to gravity. The rotors are configured with blades that invert to conform to the direction of rotation.

12 Claims, 8 Drawing Sheets

Related U.S. Application Data division of application No. 14/034,448, filed on Sep. 23, 2013, now Pat. No. 9,199,733, which is a continuation of application No. PCT/US2012/000160, filed on Mar. 22, 2012.

(60) Provisional application No. 61/465,705, filed on Mar. 22, 2011.

(51) Int. Cl.

| | | |
|---|---|---|
| *B64C 27/59* | (2006.01) | |
| *B64C 39/02* | (2006.01) | |
| *B64C 11/20* | (2006.01) | |
| *B64C 11/32* | (2006.01) | |
| *B64C 27/04* | (2006.01) | |
| *B64C 29/00* | (2006.01) | |
| *B64C 27/08* | (2006.01) | |
| *B64C 27/473* | (2006.01) | |
| *B64D 31/00* | (2006.01) | |
| *B64C 27/06* | (2006.01) | |
| *G05D 1/00* | (2006.01) | |

(52) U.S. Cl.
CPC .............. *B64D 31/00* (2013.01); *G05D 1/005* (2013.01); *G05D 1/0038* (2013.01); *B64C 2027/4733* (2013.01); *B64C 2201/024* (2013.01); *B64C 2201/027* (2013.01); *B64C 2201/042* (2013.01); *B64C 2201/108* (2013.01); *B64C 2201/126* (2013.01); *B64C 2201/127* (2013.01)

(56) References Cited

U.S. PATENT DOCUMENTS

| | | | |
|---|---|---|---|
| 2,994,492 A | 8/1961 | Dobson et al. | |
| 3,053,480 A | 9/1962 | Vanderlip | |
| 3,162,764 A | 12/1964 | Haviland | |
| 3,215,366 A | 11/1965 | Stephens | |
| 3,730,459 A | 5/1973 | Zuck | |
| 3,791,043 A | 2/1974 | Russell | |
| 3,810,713 A | 5/1974 | Joiner | |
| 3,946,554 A | 3/1976 | Neumann | |
| 4,163,535 A | 8/1979 | Austin | |
| 4,579,187 A | 4/1986 | Taylor | |
| 4,601,444 A | 7/1986 | Lindenbaum | |
| 4,979,698 A | 12/1990 | Lederman | |
| 5,004,343 A | 4/1991 | Dorschner et al. | |
| 5,791,592 A | 8/1998 | Nolan et al. | |
| 5,897,223 A | 4/1999 | Tritchew et al. | |
| 6,327,994 B1 | 12/2001 | Labrador | |
| 7,302,316 B2 | 11/2007 | Beard et al. | |
| 7,398,946 B1 | 7/2008 | Marshall | |
| 7,714,536 B1* | 5/2010 | Silberg ................. | B60L 11/002 |
| | | | 191/10 |
| 7,857,254 B2 | 12/2010 | Parks | |
| 7,874,513 B1* | 1/2011 | Smith ................. | B64C 11/001 |
| | | | 244/12.4 |
| 7,954,758 B2 | 6/2011 | McGeer et al. | |
| 8,140,200 B2 | 3/2012 | Heppe et al. | |
| 8,146,854 B2 | 4/2012 | Laurence | |
| 8,152,096 B2 | 4/2012 | Smith | |
| 8,322,648 B2 | 12/2012 | Kroetsch et al. | |
| 8,376,264 B1 | 2/2013 | Hong et al. | |
| 8,511,606 B1 | 8/2013 | Lutke et al. | |
| 8,521,339 B2 | 8/2013 | Gariepy et al. | |
| 8,579,228 B2 | 11/2013 | Monleau et al. | |
| 8,590,828 B2 | 11/2013 | Marcus | |
| 8,689,538 B2 | 4/2014 | Sankrithi et al. | |
| 8,692,171 B2 | 4/2014 | Miller et al. | |
| 8,800,936 B2 | 8/2014 | Cowley et al. | |
| 8,958,928 B2 | 2/2015 | Seydoux et al. | |
| 8,973,862 B2 | 3/2015 | Marcus | |
| 9,056,676 B1 | 6/2015 | Wang | |
| 2001/0040062 A1 | 11/2001 | Illingworth | |
| 2002/0005456 A1 | 1/2002 | Toulmay | |
| 2002/0047071 A1 | 4/2002 | Illingworth | |
| 2002/0100850 A1 | 8/2002 | Shental et al. | |
| 2002/0110374 A1 | 8/2002 | Staeheli et al. | |
| 2004/0118222 A1 | 6/2004 | Cornish et al. | |
| 2004/0129827 A1* | 7/2004 | Perlo ................. | B64C 39/026 |
| | | | 244/7 B |
| 2004/0129833 A1* | 7/2004 | Perlo ................. | B64C 27/20 |
| | | | 244/70 |
| 2004/0170501 A1 | 9/2004 | Seki | |
| 2004/0256519 A1 | 12/2004 | Ellis et al. | |
| 2005/0045762 A1 | 3/2005 | Pham | |
| 2005/0051667 A1 | 3/2005 | Arlton et al. | |
| 2006/0060693 A1 | 3/2006 | Poltorak | |
| 2006/0083501 A1 | 4/2006 | Segal et al. | |
| 2006/0231676 A1 | 10/2006 | Kusic | |
| 2007/0215750 A1 | 9/2007 | Shantz et al. | |
| 2007/0215751 A1 | 9/2007 | Robbins et al. | |
| 2008/0035786 A1 | 2/2008 | Bilyk et al. | |
| 2008/0048065 A1 | 2/2008 | Kuntz | |
| 2008/0071431 A1 | 3/2008 | Dockter et al. | |
| 2008/0149759 A1 | 6/2008 | Wallister et al. | |
| 2008/0169375 A1 | 7/2008 | Ishikawa | |
| 2008/0177432 A1 | 7/2008 | Deker et al. | |
| 2008/0206718 A1 | 8/2008 | Jaklitsch et al. | |
| 2009/0015674 A1 | 1/2009 | Alley et al. | |
| 2009/0032638 A1 | 2/2009 | Zhao et al. | |
| 2009/0045295 A1 | 2/2009 | Lundgren | |
| 2009/0050750 A1 | 2/2009 | Goossen | |
| 2009/0084890 A1* | 4/2009 | Reinhardt ........... | B64C 29/0033 |
| | | | 244/12.4 |
| 2009/0230235 A1 | 9/2009 | McNulty | |
| 2009/0250549 A1* | 10/2009 | Wiggerich ............. | B64C 27/20 |
| | | | 244/17.11 |
| 2009/0269198 A1 | 10/2009 | Grohmann et al. | |
| 2010/0014981 A1 | 1/2010 | McGeer et al. | |
| 2010/0044499 A1* | 2/2010 | Dragan ................. | B64C 1/30 |
| | | | 244/17.23 |
| 2010/0108801 A1* | 5/2010 | Olm ................. | B64C 39/024 |
| | | | 244/17.23 |
| 2010/0123039 A1 | 5/2010 | Buhl et al. | |
| 2010/0198514 A1 | 8/2010 | Miralles | |
| 2010/0243793 A1* | 9/2010 | Jermyn ................. | A63H 27/12 |
| | | | 244/17.23 |
| 2010/0243794 A1* | 9/2010 | Jermyn ................. | A63H 27/12 |
| | | | 244/17.23 |
| 2010/0250022 A1 | 9/2010 | Hines et al. | |
| 2010/0264262 A1 | 10/2010 | Zachary | |
| 2010/0292868 A1 | 11/2010 | Rotem et al. | |
| 2010/0301168 A1* | 12/2010 | Raposo ................. | A63H 23/00 |
| | | | 244/171.2 |
| 2010/0302359 A1 | 12/2010 | Adams et al. | |
| 2011/0001001 A1* | 1/2011 | Bryant ................. | B64C 29/0033 |
| | | | 244/12.5 |
| 2011/0001020 A1* | 1/2011 | Forgac ................. | B64C 29/0033 |
| | | | 244/7 A |
| 2011/0017865 A1* | 1/2011 | Achtelik ................. | B64C 27/08 |
| | | | 244/17.23 |
| 2011/0031355 A1 | 2/2011 | Alvarez | |
| 2011/0049288 A1* | 3/2011 | Suzuki ................. | B64C 37/02 |
| | | | 244/2 |
| 2011/0204188 A1* | 8/2011 | Marcus ................. | B64C 29/0058 |
| | | | 244/23 B |
| 2011/0219893 A1 | 9/2011 | Fiala et al. | |
| 2011/0226174 A1 | 9/2011 | Parks | |
| 2011/0226892 A1* | 9/2011 | Crowther ................. | B64C 1/30 |
| | | | 244/17.23 |
| 2011/0301784 A1* | 12/2011 | Oakley ................. | B64C 27/04 |
| | | | 701/2 |
| 2011/0311099 A1* | 12/2011 | Derbanne ................. | G06T 7/207 |
| | | | 382/103 |
| 2011/0314673 A1 | 12/2011 | Yamada | |
| 2011/0315806 A1 | 12/2011 | Piasecki et al. | |
| 2011/0315809 A1 | 12/2011 | Oliver | |
| 2012/0044710 A1* | 2/2012 | Jones ................. | B64C 39/024 |
| | | | 362/470 |

(56) References Cited

U.S. PATENT DOCUMENTS

| | | | |
|---|---|---|---|
| 2012/0050524 A1* | 3/2012 | Rinner | G06T 7/33 348/117 |
| 2012/0056040 A1 | 3/2012 | Brotherton-Ratcliffe et al. | |
| 2012/0056041 A1* | 3/2012 | Rhee | B64C 25/32 244/4 R |
| 2012/0083945 A1* | 4/2012 | Oakley | B64C 27/08 701/2 |
| 2012/0091257 A1 | 4/2012 | Wolff et al. | |
| 2012/0138732 A1 | 6/2012 | Olm et al. | |
| 2012/0150364 A1* | 6/2012 | Tillotson | G05D 1/101 701/3 |
| 2012/0160954 A1 | 6/2012 | Thomassey | |
| 2012/0181388 A1 | 7/2012 | Cowley | |
| 2012/0234968 A1 | 9/2012 | Smith | |
| 2012/0256042 A1 | 10/2012 | Altmikus et al. | |
| 2012/0261925 A1 | 10/2012 | Merlini, III et al. | |
| 2013/0062455 A1 | 3/2013 | Lugg et al. | |
| 2013/0068892 A1* | 3/2013 | Bin Desa | B64C 39/024 244/190 |
| 2013/0173088 A1 | 7/2013 | Callou et al. | |
| 2013/0174533 A1 | 7/2013 | Ribarov et al. | |
| 2013/0176423 A1 | 7/2013 | Rischmuller et al. | |
| 2013/0206921 A1 | 8/2013 | Paduano et al. | |
| 2013/0224021 A1 | 8/2013 | Gallet | |
| 2014/0032034 A1 | 1/2014 | Raptopoulos et al. | |
| 2014/0034775 A1* | 2/2014 | Hutson | B64C 39/024 244/17.17 |
| 2014/0037278 A1 | 2/2014 | Wang | |
| 2014/0061376 A1* | 3/2014 | Fisher | B64D 27/24 244/62 |
| 2014/0117149 A1* | 5/2014 | Zhou | A63H 27/12 244/17.23 |
| 2014/0138476 A1* | 5/2014 | Bystrom | B64C 29/00 244/17.13 |
| 2014/0158821 A1 | 6/2014 | Keennon et al. | |
| 2014/0175214 A1* | 6/2014 | Lundgren | B64D 47/08 244/17.23 |
| 2014/0222246 A1 | 8/2014 | Mohamadi | |
| 2014/0231594 A1 | 8/2014 | Marcus | |
| 2014/0327770 A1* | 11/2014 | Wagreich | G05D 1/0038 348/148 |
| 2014/0343752 A1 | 11/2014 | Fisher et al. | |
| 2014/0350748 A1 | 11/2014 | Fisher et al. | |
| 2015/0232181 A1* | 8/2015 | Oakley | B64C 39/024 701/2 |

* cited by examiner

INVERTIBLE AIRCRAFT

This application is a Continuation application of U.S. patent application Ser. No. 14/885,972, filed Oct. 15, 2016, which is a Divisional application of U.S. patent application Ser. No. 14/034,448, filed Sep. 23, 2013, now U.S. Pat. No. 9,199,733, issued Dec. 1, 2015, which is a Continuation application of International PCT Application No. PCT/US2012/000160, filed Mar. 22, 2012, which claims the benefit of U.S. Provisional Application No. 61/465,705, filed Mar. 22, 2011, each of which is incorporated herein by reference for all purposes.

The present invention relates to an aircraft configured to fly and hover in either an upright or inverted orientation with respect to gravity, and to a related rotor with invertible blades.

BACKGROUND OF THE INVENTION

A common and dangerous task for friendly personnel (e.g., military personnel or police) is clearing all or part of a building. This typically entails killing, capturing, or forcing the withdrawal of all enemy personnel (e.g., enemy combatants or criminals) in the building, while preventing innocent-bystander casualties and other collateral damage. At some point in the act of clearing a building, a first squad of friendly personnel must enter a first room the building. This activity may involve significant personal risk to the first squad. One way to lower this risk is to detonate a hand grenade, or other injury causing or incapacitating device, in the room prior to entry. Nevertheless, such a device can harm innocent bystanders and/or cause significant damage to property.

Unmanned aerial vehicles (UAVs) and unmanned ground vehicles (UGVs) have been developed for a large array of tasks. One such UAV task is for aerial reconnaissance. For example, the Raven® UAV, with a wingspan over 4 feet, provides low-altitude surveillance and reconnaissance intelligence for both military and commercial applications. Nevertheless, typical UAVs are not sized and configured for indoor flight in the crowded and complex settings typically encountered while clearing a building, and getting a UAV into a building could prove problematic in dangerous situations. Moreover, if a typical UAV were used indoors, it would be difficult for it to recover from any accidental encounter with an object that interrupted its flight and made it fall to the ground.

UGVs have been suggested for use in clearing buildings. Nevertheless, UGVs sized for indoor use would not provide good viewing angles, such as might be needed to identify enemy personnel hiding in ambush behind barriers. Furthermore, they are not configured to handle the array of obstacles (e.g., stairs) that a typical indoor surveillance device could encounter.

Accordingly, there has existed a need for an unmanned vehicle capable of being used for surveillance in a crowded, indoor environment. There has also existed a need for methods of gathering intelligence for clearing a room or building using such devices. Preferred embodiments of the present invention satisfy these and other needs, and provide further related advantages.

SUMMARY OF THE INVENTION

In various embodiments, the present invention solves some or all of the needs mentioned above, providing an unmanned vehicle capable of being used for surveillance and gathering intelligence in a crowded, indoor environment, and related methods.

A UAV rotorcraft under the present invention may include a fuselage, one or more rotors, one or more motors configured to drive the one or more rotors in rotation, and a control system. The fuselage defines a vertical dimension (i.e., with respect to the fuselage), and the rotors are generally oriented for vertical thrust (i.e., thrust along the vertical dimension with respect to the fuselage). The control system is configured to control the speed with which the one or more motors drives the one or more rotors in rotation.

Advantageously, the one or more motors are configured to drive the one or more rotors in either of two directions of rotation, and the control system is configured to control the one or more motors such that it can change a primary direction of thrust (with respect to the fuselage) developed by the one or more of rotors by reversing their direction of rotation. As a result, the rotorcraft can take off and fly in either an upright or an inverted orientation with respect to gravity. The rotorcraft is therefore not incapacitated if it becomes inverted.

An advantageous feature of the rotorcraft is that the control system may be configured to control the primary direction of thrust with respect to the fuselage based on the orientation of the fuselage with respect to gravity. Moreover, the rotorcraft may include an orientation sensor configured to sense the orientation of the fuselage with respect to gravity. Thus, the control system may be configured to control the primary direction of thrust with respect to the fuselage based on a signal from the orientation sensor and without active instruction from a remote operator of the rotorcraft.

A further advantageous feature of the rotorcraft is that the control system is configured to adapt its coordination of the rotors speeds, and to adjust the signals from all directional sensors (i.e., sensors generating data that is orientation sensitive) based on the primary direction of thrust with respect to the fuselage (i.e., based on the orientation of the fuselage with respect to gravity). Thus, operational instructions and gathered information can be provided without consideration of the orientation of the fuselage (i.e., upright or inverted) with respect to gravity.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

Figure 1:
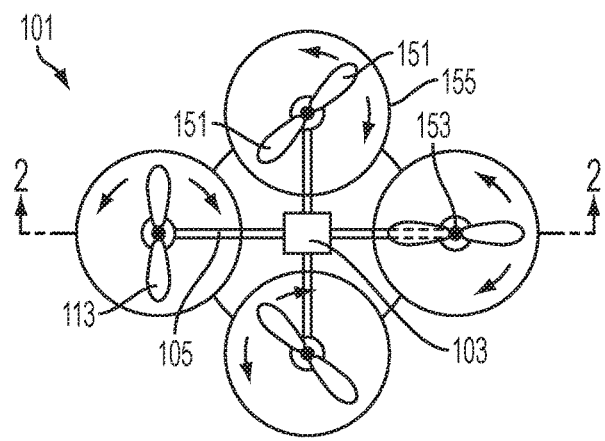
FIG. 1 is a top view of a quadrotor UAV embodying the present invention.

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Generally, embodiments of a UAV under the present invention reside in a hover-capable UAV having one or more (and typically a plurality of) vertically oriented rotors (i.e., a rotorcraft). The UAV is configured to reverse the thrust direction of one or more of the rotors to adapt it to the orientation of the UAV with respect to gravity. Preferred embodiments of the invention are quadrotor UAVs that include orientation sensors, and a control system configured to seamlessly (i.e., without requiring any user input or adaptation) change the thrust direction of each rotor to adapt to the UAVs orientation, and to adapt all command data and received sensor data accordingly.

The present invention provides for a UAV that, among other tasks, can provide for comparatively safe and civilian-friendly clearing of a building by friendly personnel (e.g., military personnel or police). In a military action of clearing a building, at some point a first squad of soldiers must enter a first room the building. This activity may involve significant personal risk to the soldiers. One way to lower this risk is to detonate a hand grenade in the room prior to entry. Unfortunately, that hand grenade can harm innocent civilians and/or cause significant damage to an innocent civilian's property.

Under a method of the invention, instead of a hand grenade, a small, remotely controlled UAV is delivered (e.g., tossed) into the room prior to the soldiers' entry into the room. Using the UAV, a pilot (typically being another of the soldiers) flies the UAV around the room and uses a video camera on the UAV to check for the presence of enemy personnel, explosives and other traps. Optionally, the UAV may be flown from room to room to further check for dangers prior to the soldiers' entry. The UAV can also either land on something, or affix itself to a surface such that it hangs from the surface without using rotor activity to maintain its position, such that it can serve as a security camera with a view (position and orientation) providing the soldiers with ongoing intelligence of developing situations, and thus better security.

One problem with using a small quadrotor UAV for this is procedure is that the UAV, when it is first tossed into the room, might land in an upside-down (i.e., inverted) orientation. Another problem is that during flight, the UAV might be knocked to the floor (either by inadvertently running into something or being batted down), and end up in an inverted orientation. This later risk is particularly relevant when flying through rooms with hanging objects (e.g., lights, fans and plants). In either case, a typical UAV, when inverted, would be effectively immobilized with no way to right itself (i.e., to turn itself upright). A UAV under the preferred embodiment can adapt to being inverted and proceed accordingly.

With reference to FIGS. 1 to 4, a UAV 101 under a first embodiment of the invention is a quadrotor that defines an upright orientation (see, e.g., FIG. 2) with respect to gravity 91, i.e., it defines a vertical dimension 93 and an upward direction 95 with respect to the fuselage that is opposite the direction of gravity when the fuselage is in the upright orientation. The quadrotor also defines an inverted orientation (see, e.g., FIG. 3) with respect to gravity 91 in which the upward direction 95 with respect to the fuselage is in the same direction as gravity.

The UAV 101 includes a body serving as a central fuselage 103, and four propulsion arms 105 extending laterally from a proximal end 107 that is connected to the fuselage, to a distal end 109. The UAV also includes four electric motors 111. Each motor is attached to the distal end of a respective propulsion arm. Each motor has a rotor 113 that is configured to be driven in rotation by the motor in an orientation (i.e., a rotational direction) that causes vertically downward thrust 115 with respect to gravity when the UAV is in the upright orientation with respect to gravity (see, e.g., FIG. 2). The combination of the motor and the rotor form a thruster configured to provide thrust in a primary direction of thrust with respect to the fuselage, i.e., along the vertical dimension.

The fuselage 103 includes a power source such as a battery 121, a flight control system 123, and a sensor system 125 that includes a camera 127 and an orientation sensor 129. The control system is configured to control the speed with which the motors drive the rotors in rotation. It is further configured to reverse the direction of rotation of the rotors, and thus the motors are configured to drive the rotors in either of two directions of rotation.

The control system is configured, i.e., programmed, to coordinate the operation of the rotors to accomplish controlled flight in response to a flight controller, as is known for quadrotor aircraft. This may be done in response to manual instructions sent by a flight controller in the form of a remote operator (such as is known for remote control vehicles operated by people) who is operating a ground station 131 configured with a processor 132, a display 133 to display a video feed from the UAV camera 127, manual controls 135, a wireless transceiver 137, and a power source such as a battery 139.

The manual controls 135 are human operated controls for manual flight, which may be in the form of an electronic or electromechanical device such as a game controller or standard remote control transmitter. The ground station wireless transceiver 137 is configured to communicate via a wireless connection 141 with a UAV wireless transceiver 143 to send the operator's high-level flight control inputs to the UAV flight control system 123, and to receive information (such as a video feed) back from the UAV camera 127. Alternatively, high-level flight control inputs may be generated in response to automated instructions within the flight control system in the form of a preset and/or adaptive control program. This control program may use input from other sensors 145 such as a signal from a GPS (Global Positioning System) sensor.

Typically, these instructions (whether manual or automated) will be directed to high-level flight instructions (e.g., fly higher, fly forward, turn, and the like) and payload instructions (e.g., turn on the camera, pan the camera, and the like). The control system 123 is adapted to convert the high-level instructions into low-level instructions, such as instructions that activate individual motors to actuate their rotors at the desired rotor rotation rates and in the desired directions, or instructions that control the power delivered to the motors to accomplish that same purpose.

In the present embodiment, during typical flight all of the rotors 113 will be creating thrust in the primary direction of thrust with respect to the fuselage 103. That primary direction of thrust will be in the vertical dimension 93, and will be either in a downward direction 97 or the upward direction 95 with respect to the fuselage. At any given time during flight, for flight control reasons, it is possible that one or more of the rotors could be directed to reverse its thrust direction (without changing the primary direction of thrust of the UAV). This ability can add to the agility and maneuverability of the UAV, and/or assist it in conducting unusual maneuvers, such as to free itself from an entanglement.

The control system 123 is further configured to control the one or more motors 111 such that it can change the primary direction of thrust with respect to the fuselage (developed by the rotors) between the upward direction 95 and the downward direction 97. The primary direction of thrust is changed based on the orientation of the rotorcraft fuselage with respect to gravity. Such a change is normally done prior to takeoff. This may be done manually, i.e., at the direction of a remote operator observing the camera and manipulating the manual controls 135, or by the control system 123 based on a signal from the orientation sensor 129. Thus, the UAV can adapt its primary direction of thrust based on its orientation. The primary direction of thrust might also be changed during flight for a rapid, powered descent, should one be needed.

The control system 123 is further configured to adapt its coordination of the rotor speeds and directions based on the primary direction of thrust (which is based on the orientation of gravity). In other words, the low-level instructions vary based on the orientation of the aircraft such that high-level instructions such as fly up and forward can be made without consideration of the orientation of the UAV 101 with respect to gravity.

The UAV camera 127 has a field of view, which may be static with respect to the fuselage, or movable via an actuator. Thus, the camera is a directional sensor configured to sense the external environment, and provides a video feed for display on the display 133, allowing an operator to control the UAV, and providing useful information to the operator (such as the presence of dangers to personnel in the vicinity of the UAV). The control system 123 is configured to adjust the signal of this directional sensor (and any other onboard directional sensors) based on the primary direction of thrust. Thus, a remote operator or a person reviewing the sensor data will view the information (e.g., the video feed) in a correct orientation with respect to gravity without having to take any manual procedures to correct the orientation. In other words, if the UAV is flying upside down, the control system automatically flips the picture so it is right side up when viewed by the operator.

In a variation of this embodiment, the UAV 101 could deliver an uncorrected sensor stream (e.g., a video feed not corrected for the orientation with respect to gravity), along with an orientation signal (from the orientation sensor 129) indicating the orientation of the UAV with respect to gravity. The orientation signal may be continuously sent, or may be sent at the initiation of each flight. The ground station 131 would then be configured to correct the orientation of the information displayed on the display 133 based on the orientation signal (which is in turn based on the orientation of the UAV with respect to gravity).

With reference to FIGS. 1 to 5, each rotor 113 of the UAV has a plurality of blades 151 that extend longitudinally out from a hub 153 along a longitudinal blade axis 157, and blade guard 155 surrounding the path through which the blades rotate. The longitudinal axis is normal to the cross-sectional view of FIG. 5. The blade guard protects people and things near the UAV from being hit by a blade. At the same time, the blade guard guards against things becoming entangled in the rotor, and against the rotor being inadvertently stopped when the UAV strikes something.

In a first blade embodiment, and contrary to well accepted practice, the rotor blades 151 are not configured as airfoils in which the camber is different (e.g., larger) near a leading edge than near a trailing edge (as is typical for propellers and rotors). Instead, the blade is characterized by a 2-fold symmetry along the longitudinal blade axis (i.e., the cross section of the blade looks no different when rotated 180° around the longitudinal blade axis. As a result, each blade is configured to produce equal thrust in either direction of rotation for a given rotational speed.

Figure 6:
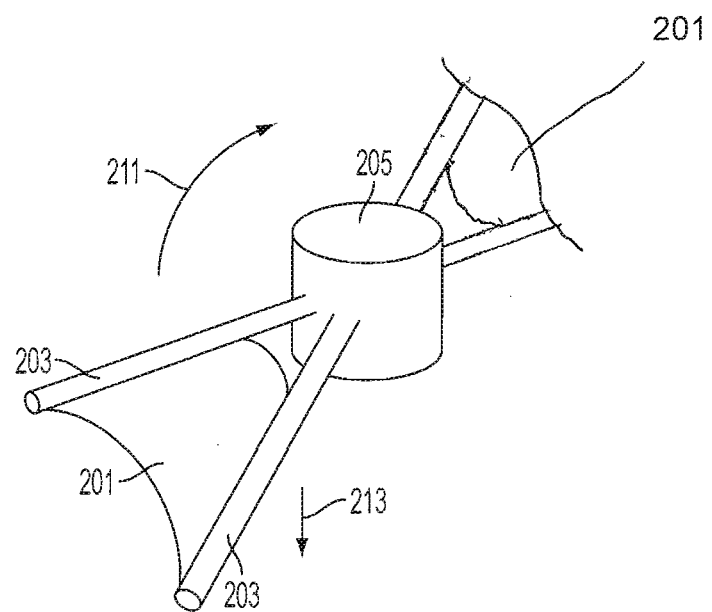
FIG. 6 is a partial perspective view of an alternative version of a rotor for the quadrotor UAV of FIG. 1.

With reference to FIG. 6, in a variation of the blade for the embodiment, each blade camber could be configured to be adaptable based on the direction of rotation of the rotor. In one version, each blade includes a section of sailcloth 201 that extends between two relatively rigid frame elements 203 that extend out from a rotor hub 205. The frame elements are offset from one another such that with the sailcloth hung loosely, the sailcloth will bow out during rotation of the rotor. As a result, when the rotor rotates in a first rotational direction 211, the sailcloth will bow out in a shape adapted to produce thrust in a first thrust direction 213. When the rotor rotates in the opposite rotational direction, the sailcloth will bow out in another shape that is adapted to produce thrust in the opposite thrust direction.

Figure 7:
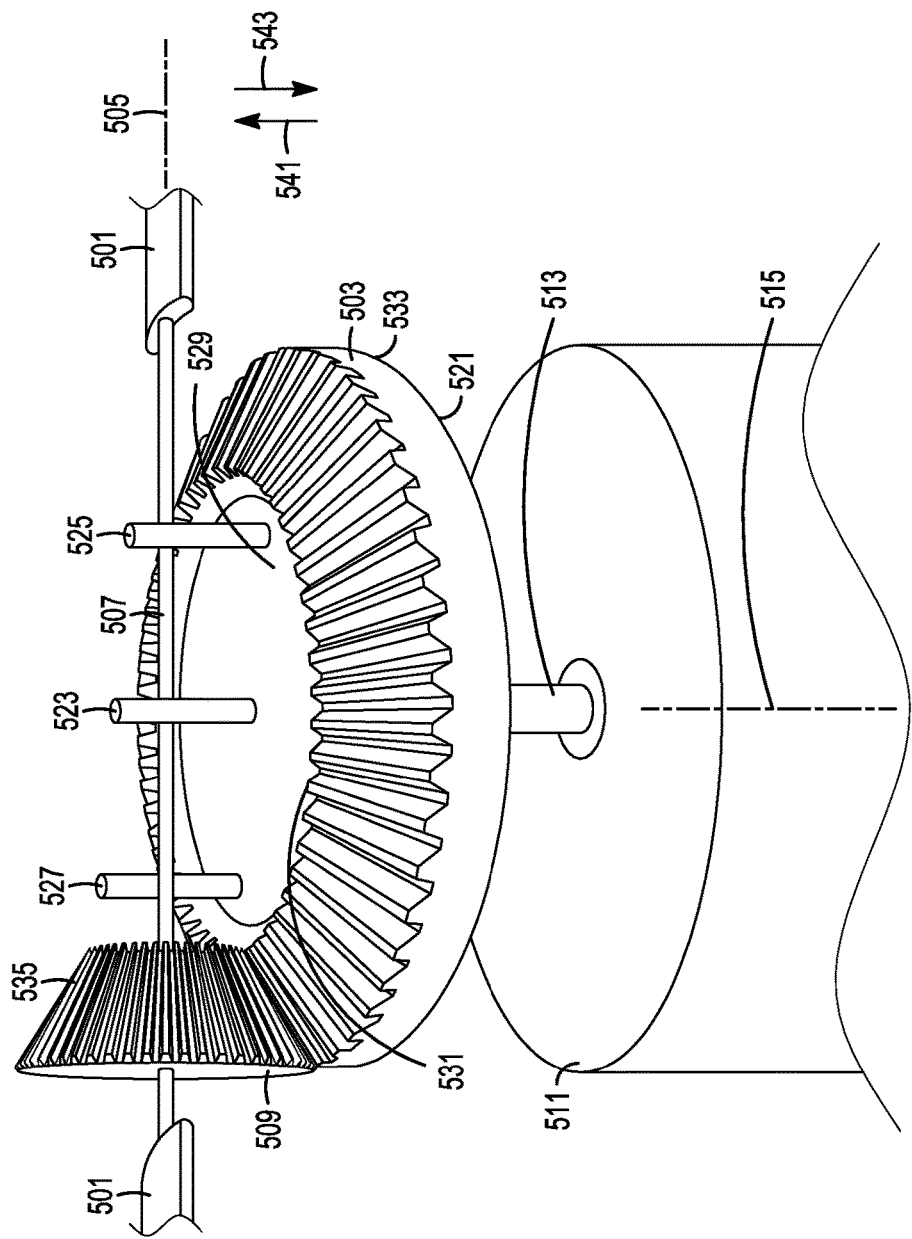
FIG. 7 is a perspective view of a thruster including a motor, a blade inversion mechanism and a rotor for one embodiment of the quadrotor UAV.

With reference to FIG. 7, in another blade embodiment, blades 501 are configured with an efficient camber and shape for producing thrust in one direction, as is well known for aircraft propellers and helicopter rotors. To adapt to being used in either of two rotor rotational directions, the rotor is configured with a blade inversion mechanism 503 that rotates each blade around its own longitudinal blade axis 505 such that the blade can be oriented in two positions that are substantially 180 degrees apart. The blade is thereby adjustable to be oriented in the correct direction to create efficient thrust in either direction (i.e., up or down with respect to the rotorcraft, in other words, down with respect to gravity). The blades are adjustably oriented based upon the direction the rotor is rotating, which in turn is based on the orientation of the rotorcraft with respect to gravity.

In this embodiment, the two blades 501 are mounted on a blade shaft 507 that extends along the blade axes 505 of both blades. Rigidly mounted on the blade shaft is a circular gear 509 (in the form of a spur gear) forming a gear plane that is normal to the blade shaft and the blade axes. The motor is within a motor housing 511, and is configured to rotate a motor shaft 513 with respect to the motor housing around a motor axis of rotation 515. The blade inversion mechanism 503 includes an inversion disk 521, a support 523, a first stop 525 and a second stop 527. The support, the first stop and the second stop are each attached to the inversion disk.

The inversion disk is a flat, circular disk that is rotationally symmetric around the motor axis of rotation 515 and forms a drive surface 529. The inversion disk 521 is rigidly attached to the motor shaft 513 with the drive surface normal to the motor axis of rotation. Imprinted into the drive surface 529 of the inversion disk 521 is a circular track of teeth 531 concentrically encircling the support 523, effectively forming the inversion disk into an inversion gear 533 in the form of a crown gear.

The support 523 is restrained by the inversion disk 521 such that it is held in place with respect to the inversion disk, but can freely rotate around the motor axis of rotation 515 with respect to the inversion disk. The blade shaft 507, in turn, is restrained by the support 523 such that the blade shaft is held in place with respect to the support, but can freely rotate around the blade axes 505 with respect to the support. The circular gear 509 has a plurality of teeth 535. The circular gear teeth 535 are in contact with the inversion gear teeth 531 such that the circular gear 509 is meshed with the inversion gear 533.

As a result of this configuration, the blades 501, blade shaft 507 and support 523 can freely rotate around the motor axis of rotation 515 with respect to the inversion disk 521. When the blades, blade shaft and support rotate around the motor axis of rotation with respect to the inversion disk, the inversion gear 533, which is meshed with the circular gear 509, drives the blades and the blade shaft in rotation around the blade axes 505 with respect to the support 523.

The first and second stops 525, 527, are rigidly affixed to the inversion disk 521 on opposite sides of the support 523. They extend up into the path of the blade shaft 507 as it rotates around the motor axis of rotation 515 with respect to the inversion disk, providing first and second limits to the range of positions through which the blade shaft can rotate with respect to the inversion disk. While this function could be accomplished by a single stop, it is preferable to use two in order to keep the rotor rotationally balanced around the motor axis of rotation 515. Alternatively, other balancing mechanisms may be used to rotationally balance the rotor.

At the first limit to the range of positions through which the blade shaft can rotate with respect to the inversion disk 521, the blades are oriented for efficient thrust in a first direction 541 parallel to the motor axis of rotation 515. At the second limit to the range of positions through which the blade shaft can rotate with respect to the inversion disk, the blades are oriented for efficient thrust in a second direction 543 parallel to the motor axis of rotation 515. The first and second directions are opposite one another. The orientation of the blades 501 around the blade axes 505 while in the first position, is substantially 180 degrees from the orientation of the blades around the blade axes while in the second position, with respect to the support.

The first and second stops 525, 527 are magnetic, and the blade shaft 507 is composed of a ferromagnetic material. As a result, when the blade shaft is in the first position the magnets will apply a force attempting to hold it in the first position. Likewise, when the blade shaft is in the second position the magnets will apply a force attempting to hold it in the second position.

When initially activated, the motor will apply a rotational force around the motor axis of rotation 515 to the inversion disk 521, causing it to spin. Because the blades 501 and blade shaft 507 can rotate around the motor axis of rotation, with respect to the inversion disk, the rotational inertia of the blades and blade shaft around the motor axis of rotation 515 will cause the inversion disk to rotate with respect to the blades and blade shaft. The force of the motor is greater than the restraining force of the magnets, so the blade shaft will pull away from the magnetic stops if the blade shaft is in the wrong limit position around the motor axis of rotation.

The meshed gears 509, 531, will in turn drive the blades and blade shaft in rotation around the blade axes 505 until the blade shaft reaches the appropriate limit position (either the first or second limit of the range of positions through which the blade shaft can rotate around the motor axis of rotation) with respect to the inversion disk. The magnetic nature of the stops with the blade shaft at the newly reached limit position will limit the blade shafts from bouncing off of the stops as the blade shaft reaches the new position.

At that limit position, the first and second stops will drive the blades and blade shaft in rotation around the motor axis. It should be noted that the blades and blade shaft have a much lower rotational inertia around the blade axis than around the motor axis of rotation, thus leading to the gears causing rotation around the blade axes rather than rotation around the motor axis of rotation.

If difficulties arise from the magnetic stops restraining the mechanism from driving the blade shaft to the appropriate limit position, an additional procedure may be used. In particular, the blades may first be driven in the wrong direction, and then be driven in the appropriate position. The angular momentum of the blades spinning in the wrong direction will then help to break the magnetic hold of the stops on the blade shaft.

Figure 8:
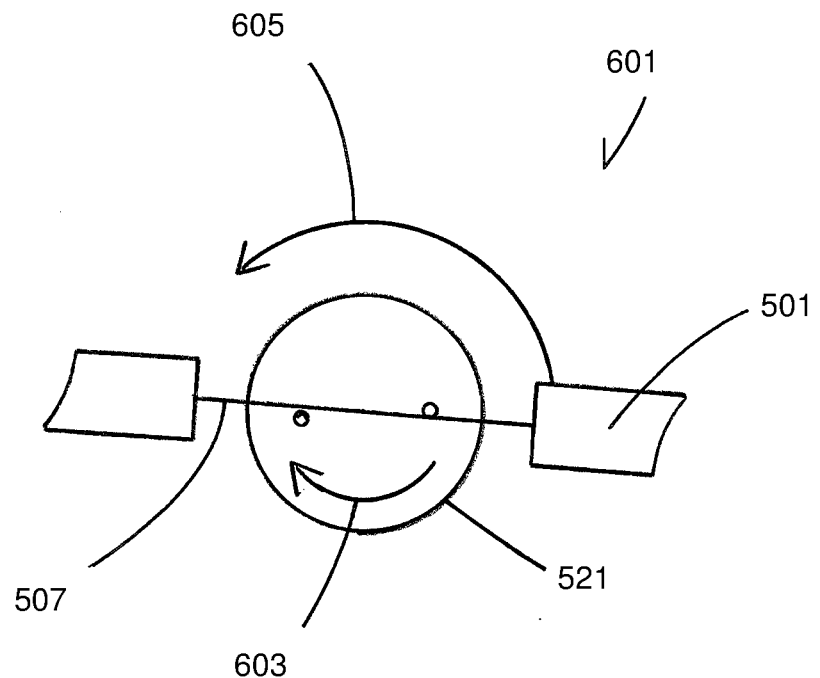
FIG. 8 is a first schematic view of the thruster of FIG. 7.
Figure 9:
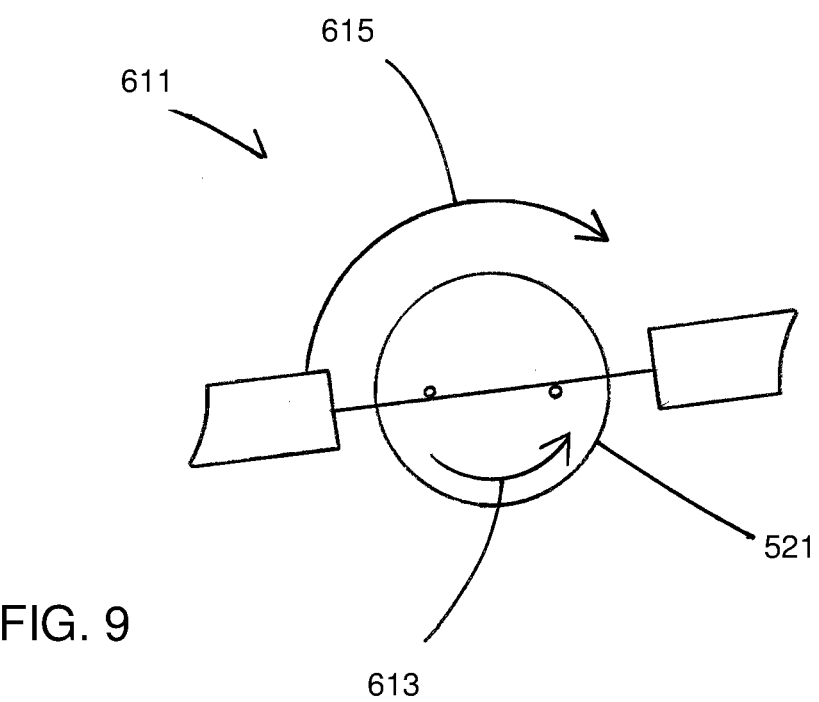
FIG. 9 is a second schematic view of the thruster of FIG. 7.

FIGS. 8 and 9, depict the transition of the thruster between then upright orientation (shown in FIG. 8) and the inverted orientation (shown in FIG. 9). In a first relative orientation 601, the inversion disk 521 is rotating in a first direction 603 around the motor axis of rotation (relative to the motor housing), which causes the rotor (including the blades 501 and blade shaft 507) to rotate in a second direction 605 around the motor axis of rotation, relative to the inversion disk. In this orientation, the blades are positioned for upright flight, and the inversion disk drives the blades in rotation around the motor axis of rotation (relative to the motor housing) to provide upright vertical thrust.

In a second relative orientation 611, the inversion disk 521 is rotating in a third direction 613 around the motor axis of rotation (relative to the motor housing), which causes the rotor to rotate in a fourth direction 615 around the motor axis of rotation, relative to the inversion disk. The first and third directions of rotation relative to the motor housing are opposite one another. Likewise, the second and fourth directions of rotation relative to the inversion disk are opposite one another. In this orientation, the blades are positioned for inverted flight, and the inversion disk drives the blades in rotation around the motor axis of rotation (relative to the motor housing) to provide inverted vertical thrust.

Many variations of this blade embodiment are within the scope of the invention. For example, in the present embodiment, the first and second positions of the blades and blade shaft are almost 180 degrees apart around the motor axis of rotation. If four stops are used (or two stops with additional weights to balance the rotor), a much smaller rotation could be set between the first and second position limits. This could lead to a significantly smaller circular gear as compared to the size of the inversion disk.

Figure 10:
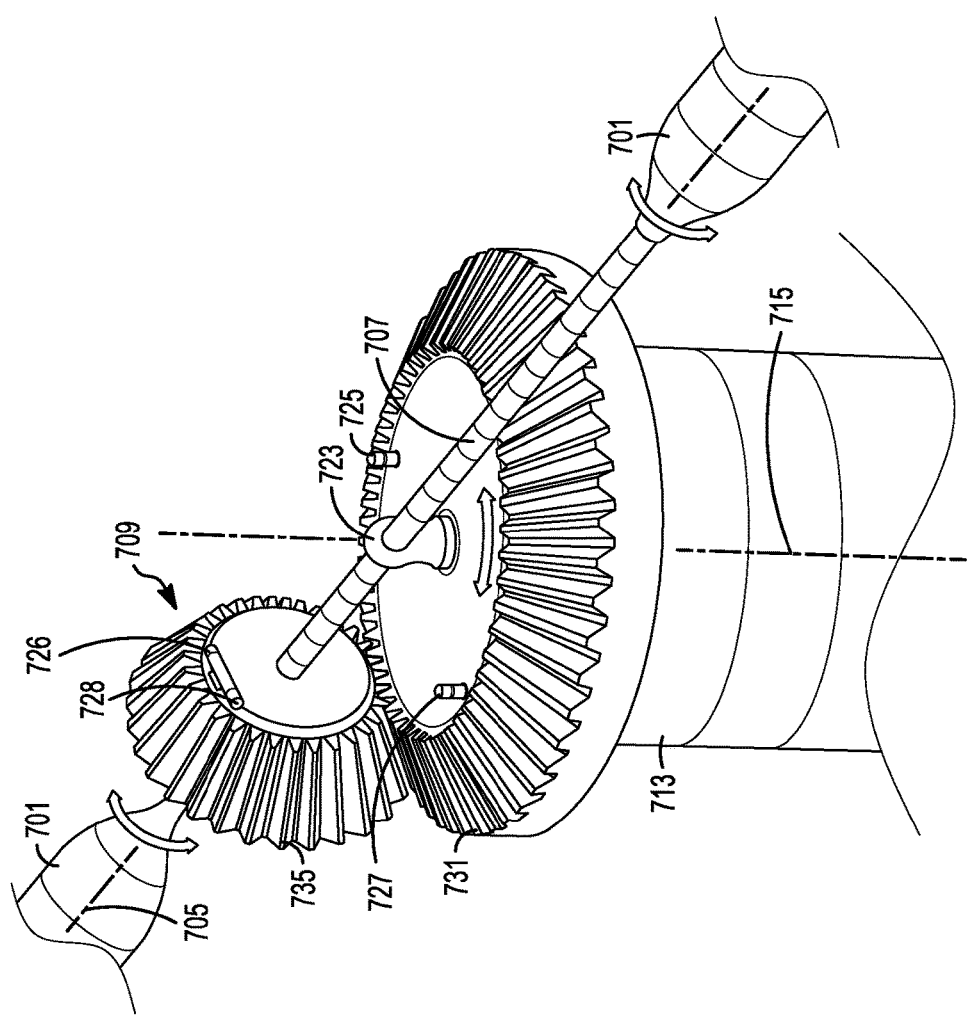
FIG. 10 is a perspective view of variation of the thruster of FIG. 7.

With reference to FIG. 10, other configurations of stops may be used. For example, in a variation of this blade embodiment, blades 701 are again configured with an efficient camber and shape for producing thrust in one direction, as is well known for aircraft propellers and helicopter rotors. To adapt to being used in either of two rotor rotational directions, the rotor is configured with a similar blade inversion mechanism 703 that rotates each blade around its own longitudinal blade axis 705 such that the blade can be oriented in two positions that are substantially 180 degrees apart. The blade is thereby adjustable to be oriented in the correct direction to create efficient thrust in either direction (i.e., up or down with respect to the rotorcraft, in other words, down with respect to gravity). The blades are adjustably oriented based upon the direction the rotor is rotating, which in turn is based on the orientation of the rotorcraft with respect to gravity.

As was the case in the prior variation, in this variation, the two blades 701 are mounted on a blade shaft 707 that extends along the blade axes 705 of both blades. Rigidly mounted on the blade shaft is a circular gear 709 (in the form of a spur gear) forming a gear plane that is normal to the blade shaft and the blade axes. Mounted on the circular gear is a circular-gear stop having a first magnetic end 726 and a second magnetic end 728.

The motor is within a motor housing, and is configured to rotate a motor shaft 713 with respect to the motor housing around a motor axis of rotation 715. The blade inversion mechanism 703 includes an inversion disk 721, a support 723, a first inversion-disk stop 725 and a second inversion-disk stop 727. The support, the first inversion-disk stop and the second inversion-disk stop are each attached to the inversion disk.

The inversion disk is a flat, circular disk that is rotationally symmetric around the motor axis of rotation 715 and forms a drive surface 729. The inversion disk 721 is rigidly attached to the motor shaft 713 with the drive surface normal to the motor axis of rotation. Imprinted into the drive surface 729 of the inversion disk 721 is a circular track of teeth 731 concentrically encircling the support 723, effectively forming the inversion disk into an inversion gear 733 in the form of a crown gear.

The support 723 is restrained by the inversion disk 721 such that it is held in place with respect to the inversion disk, but can freely rotate around the motor axis of rotation 715 with respect to the inversion disk. The blade shaft 707, in turn, is restrained by the support 723 such that the blade shaft is held in place with respect to the support, but can freely rotate around the blade axes 705 with respect to the support. The circular gear 709 has a plurality of teeth 735. The circular gear teeth 735 are in contact with the inversion gear teeth 731 such that the circular gear 709 is meshed with the inversion gear 733.

As a result of this configuration, the blades 701, blade shaft 707 and support 723 can freely rotate around the motor axis of rotation 715 with respect to the inversion disk 721. When the blades, blade shaft and support rotate around the motor axis of rotation with respect to the inversion disk, the inversion gear 733, which is meshed with the circular gear 709, drives the blades and the blade shaft in rotation around the blade axes 705 with respect to the support 723.

The first and second inversion-disk stops 725, 727, are rigidly affixed to the inversion disk 721 on opposite sides of the support 723. They are positioned such that they respectively block the path of the first magnetic end 726 and a second magnetic end 728 of the circular gear stop as the circular gear rotates around the motor axis of rotation 715 with respect to the inversion disk, providing first and second limits to the range of positions through which the blade shaft can rotate with respect to the inversion disk.

As in the prior variation, at the first limit to the range of positions through which the blade shaft can rotate with respect to the inversion disk 721, the blades are oriented for efficient thrust in a first direction 741 parallel to the motor axis of rotation 715. At the second limit to the range of positions through which the blade shaft can rotate with respect to the inversion disk, the blades are oriented for efficient thrust in a second direction 743 parallel to the motor axis of rotation 715. The first and second directions are opposite one another. The orientation of the blades 701 around the blade axes 705 while in the first position, is substantially 180 degrees from the orientation of the blades around the blade axes while in the second position, with respect to the support.

The first and second inversion gear stops 725, 727 are magnetic, and the two ends of the circular gear stop are magnetic. As a result, when the blade shaft is in the first position, two of the magnets will apply a force attempting to hold it in the first position. Likewise, when the blade shaft is in the second position, the other two magnets will apply a force attempting to hold it in the second position.

When initially activated, the motor will apply a rotational force around the motor axis of rotation 715 to the inversion disk 721, causing it to spin. Because the blades 701 and blade shaft 707 can rotate around the motor axis of rotation, with respect to the inversion disk, the rotational inertia of the blades and blade shaft around the motor axis of rotation 715 will cause the inversion disk to rotate with respect to the blades and blade shaft. The force of the motor is greater than the restraining force of the magnets, so the blade shaft will pull away from the magnetic stops if the blade shaft is in the wrong limit position around the motor axis of rotation.

The meshed gears 709, 731, will in turn drive the blades and blade shaft in rotation around the blade axes 705 until the blade shaft reaches the appropriate limit position (either the first or second limit of the range of positions through which the blade shaft can rotate around the motor axis of rotation) with respect to the inversion disk. The magnetic nature of the stops with the blade shaft at the newly reached limit position will limit the blade shafts from bouncing off of the stops as the blade shaft reaches the new position.

At that limit position, the stops will drive the blades and blade shaft in rotation around the motor axis. It should be noted that the blades and blade shaft have a much lower rotational inertia around the blade axis than around the motor axis of rotation, thus leading to the gears causing rotation around the blade axes rather than rotation around the motor axis of rotation.

If difficulties arise from the magnetic stops restraining the mechanism from driving the blade shaft to the appropriate limit position, an additional procedure may be used. In particular, the blades may first be driven in the wrong direction, and then be driven in the appropriate position. The angular momentum of the blades spinning in the wrong direction will then help to break the magnetic hold of the stops on the blade shaft.

In another variation, the rotor could be configured with more than two blades. To do that, separate gearing would likely be provided for each blade, or for each pair of blades. In yet other variations, this blade inversion mechanism could be driven through a variety of other structural arrangements, both using other arrangements of gears and/or other rotational mechanisms. For example, the blade inversion could be driven by a separate motor mechanism that is actively controlled by a control system.

Figure 11:
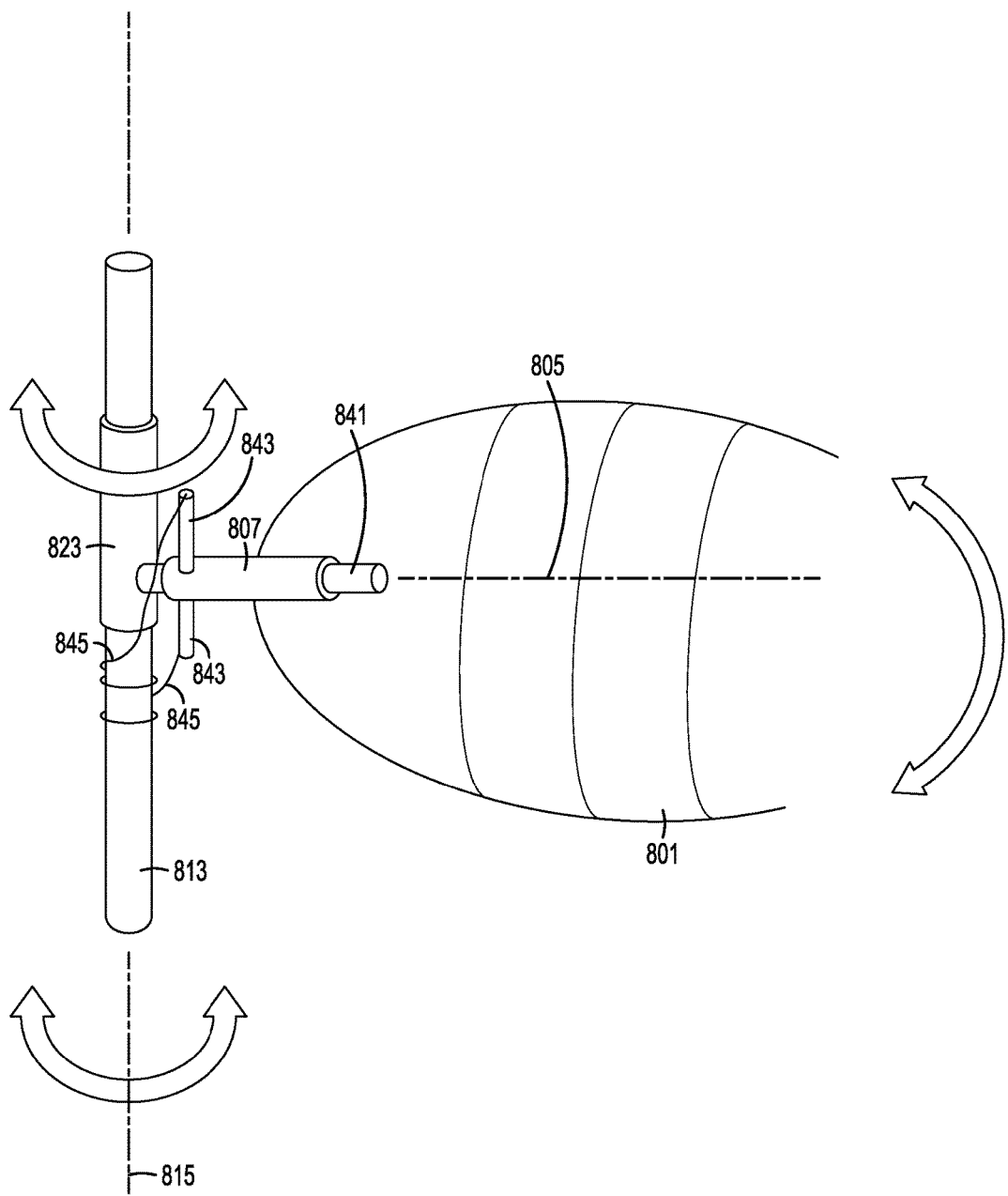
FIG. 11 is a perspective view of another embodiment of a thruster including a motor, a blade inversion mechanism and a rotor.

With reference to FIG. 11, in another rotational mechanism, the rotor is driven by cables and/or strings. More particularly, a motor shaft 813 is configured to be driven in rotation around a motor axis of rotation 815 by a motor. A support 823 is concentrically received on the motor shaft, and is configured to freely rotate around the motor axis of rotation with respect to the motor shaft. The support has a support shaft 841 extending laterally in a direction forming a blade axis 805 for a blade 801. The blade is carried on a blade shaft 807, which is concentrically received on the support shaft, and is configured to freely rotate around the blade axis with respect to the support 823.

The blade shaft 807 has first and second arms 843 extending in opposite directions normal to the blade axis 805. Each arm is provided with a cable 845 that is wrapped around and attached to the motor shaft 813. The cables of the two arms are wrapped in opposite directions. When the motor shaft rotates in the first direction, a first arm's cable wraps tightly around the motor shaft, while the second arm's cable loosens up. As a result, the tightly wrapped first-arm cable pulls on its arm, causing the first arm to drive the blade to rotate around the blade axis of rotation with respect to the support 823, and then causing the blade to rotate around the motor axis of rotation. When the motor shaft rotates in a second, opposite direction, the second arm's cable wraps tightly around the motor shaft, while the first arm's cable loosens up. As a result, the tightly wrapped second-arm cable pulls on its arm, causing the arm to drive the blade to rotate in the opposite direction around the blade axis of rotation with respect to the support 823, and then causing the blade to rotate around the motor axis of rotation in the opposite direction.

It should be noted that the various blade inversion mechanisms are not limited to mechanisms that rotate each blade 180 degrees around its blade axis. If differing amounts of thrust are required in the opposite directions, or if differing environmental conditions exist between the use in one direction and in the other direction, then it might be preferable to rotate to positions a little over or a little under 180 degrees. Moreover, while the two limit positions are generally 180 degrees apart, the blades could be rotated much more to travel between those positions. For example, if a much smaller circular gear is desired with respect to the inversion disk, the gearing could be configured for the blades to rotate 540 degrees (i.e., 180 degrees plus 360 degrees), or 900 degrees (i.e., 180 degrees plus 720 degrees).

It should be noted that the blade inversion mechanism may have significant uses outside of the aircraft arts. For example, a rotor having this blade inversion mechanism could be used for a wide variety of fans ranging from ceiling fans to fans used in a wide variety of industrial applications. Likewise, the blade inversion mechanism may also have marine applications.

Figure 2:
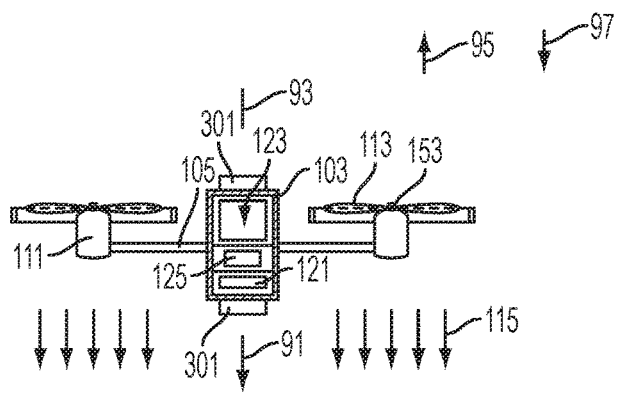
FIG. 2 is a front cross-sectional view of the quadrotor UAV of FIG. 1, taken at line 2-2 of FIG. 1, flying in an upright orientation.
Figure 3:
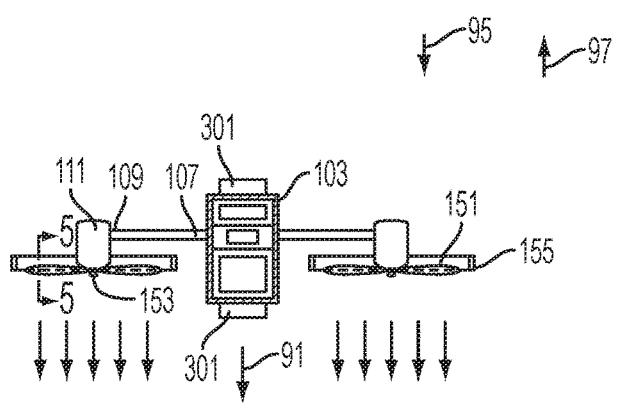
FIG. 3 is a front cross-sectional view of the quadrotor UAV of FIG. 1, taken at line 2-2 of FIG. 1, flying in an inverted orientation.
Figure 4:
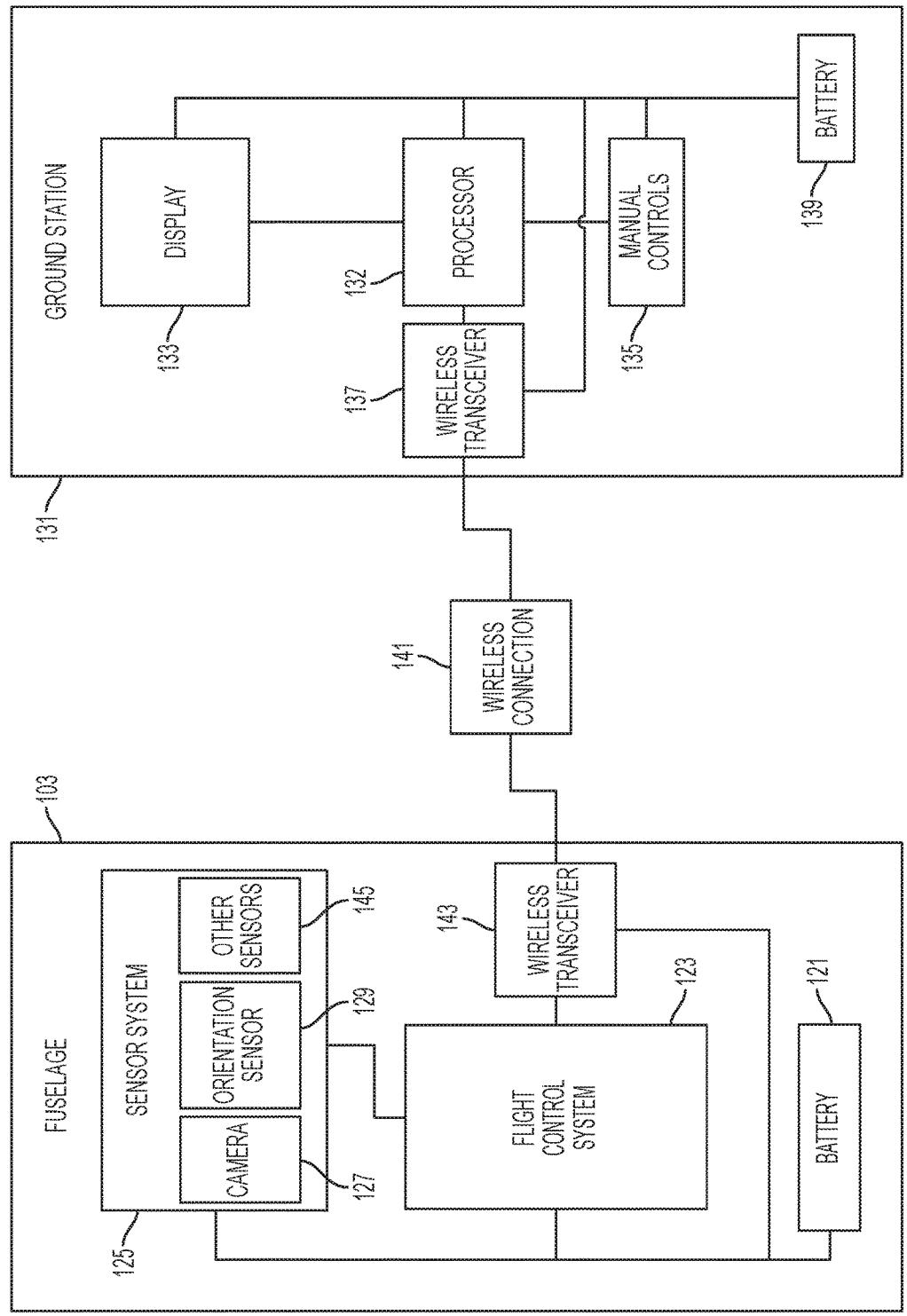
FIG. 4 is a schematic diagram of portions of the quadrotor UAV of FIG. 1 and a ground station for the quadrotor UAV of FIG. 1.
Figure 5:
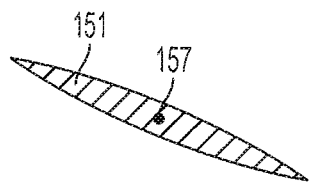
FIG. 5 is a cross-sectional view of a blade of the quadrotor UAV of FIG. 1, taken at line 5-5 of FIG. 3.

With reference to FIGS. 1 to 3, the embodiment may further include one or more surface-connection devices 301 configured to allow the rotorcraft to affix itself to a surface such that it hangs from the surface, and thus that it does not need rotor activity to maintain the position. Such surface-connection devices may be of a variety of types (e.g., magnets, adhesive devices, hook and latch materials, and suction devices), and their selection will depend on the nature of the environment in which the UAV will operate. The reversibility of the motors can provide for an increased ability of the rotorcraft to break free of such a connection once it is no longer desired. For example, two rotors pushing one way and two pushing the other might provide enough torque to free a hook and latch attachment.

Other embodiments include variations of the above-described information. For example, such embodiments may be based on other numbers of motors and/or rotors, and more generally can be described as having one or more motors, and/or one or more rotors.

Figure 12:
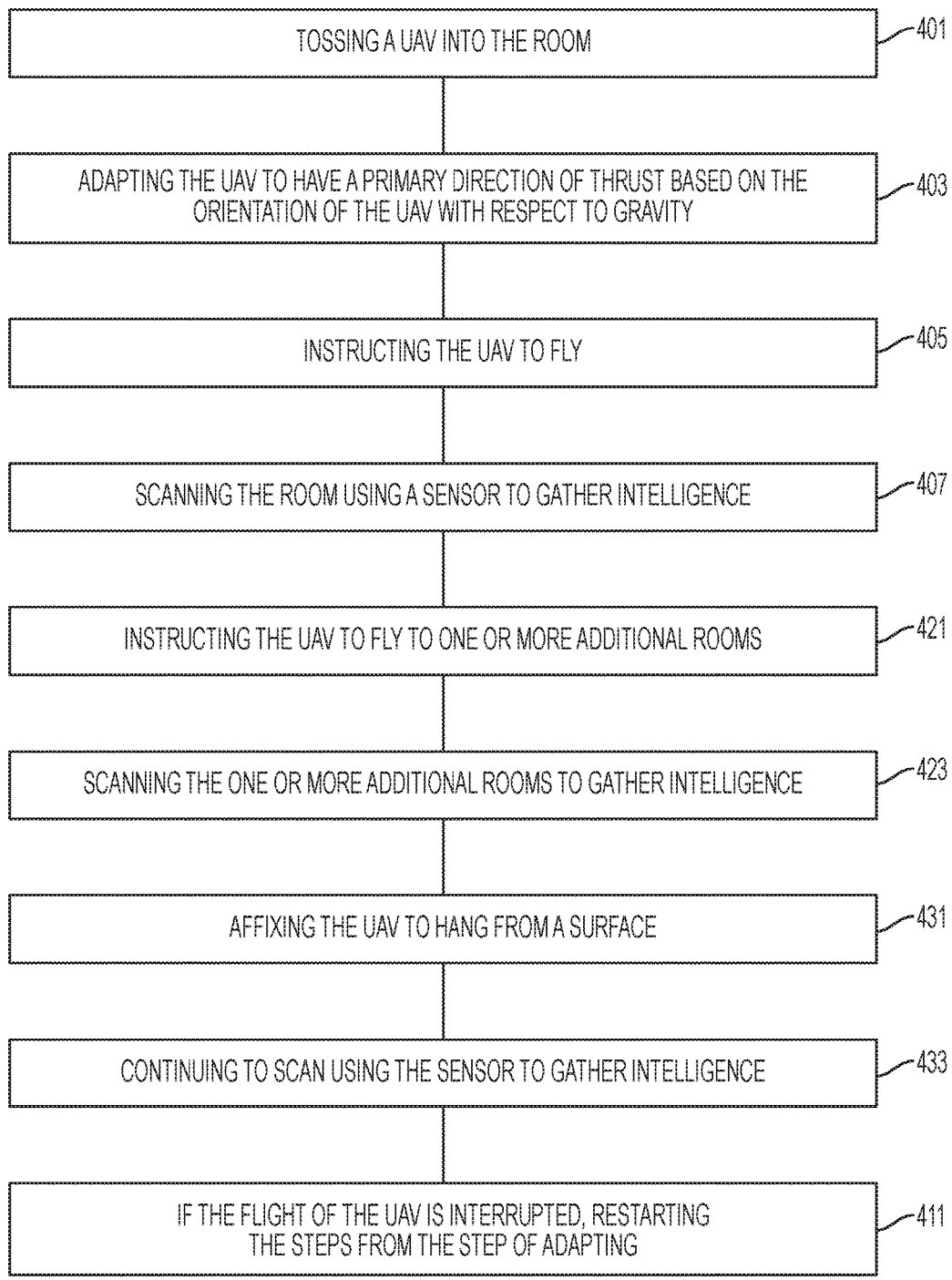
FIG. 12 is a process diagram for a method embodying the present invention.

With reference to FIG. 12, a method of gathering intelligence (such as of dangers) prior to entering a room under the invention resides in the steps of 1) delivering 401 (e.g., tossing) a UAV such as the above-described UAV quadrotor into the room, 2) adapting 403 the UAV to have a primary direction of thrust based on the orientation of the UAV with respect to gravity once it has come to rest in the room, 3) instructing 405 the UAV to fly, and 4) scanning 407 the room using a sensor such as the camera to gather intelligence, such as determining the presence of dangers. While these steps will typically be conducted in sequential order (and/or simultaneously for some of the steps), other orders are possible, such as scanning the room prior to flight. Optionally, the method may also include the step of 5) if the flight of the UAV is interrupted prior to the completion of steps (2) through (4) (or before the completion of all the steps if there are more steps), then restarting 411 all the steps from step (2).

Optionally, method may alternatively or further include the steps of 5) instructing 421 the UAV to fly to one or more additional rooms, and 6) scanning 423 the one or more additional rooms, using the sensor, to further gather intelligence, such as determining the presence of additional dangers, prior to entry. Optionally, the method may also or alternatively include the steps of 5) affixing 431 the UAV to hang from a surface in a position and orientation in which the sensor can provide continuing intelligence, such as of dangers, and 6) continuing 433 to scan using the sensor to gather intelligence, such as of developing dangers, from the position in which the UAV is affixed.

It is to be understood that the invention comprises apparatus and methods for designing and for producing UAVs, as well as the apparatus and methods of using the UAV. Additionally, the various embodiments of the invention can incorporate various combinations of these features with existing UAV missions. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A rotorcraft, comprising: a fuselage defining a vertical dimension with respect to the fuselage, the fuselage being characterized by having a right-side-up orientation and an upside-down orientation with respect to gravity; one or more rotors generally having vertically oriented for vertical thrust axes of rotation with respect to the fuselage; one or more motors connected to the one or more rotors; and a control system controlling a speed with which the one or more motors drives the one or more rotors in rotor rotation, and controlling the direction of thrust generated by the rotors;

wherein the control system reverses the direction of thrust when the fuselage has switched between the right-side-up orientation and the upside-down orientation.

2. The rotorcraft of claim 1, wherein the control system controls the direction of thrust based on the orientation of the fuselage with respect to gravity.

3. The rotorcraft of claim 1, and further comprising an orientation sensor sensing the orientation of the fuselage with respect to gravity, wherein the control system controls the direction of thrust based on a signal from the orientation sensor.

4. The rotorcraft of claim 1, wherein the control system is programmed to coordinate the operation of the rotors to accomplish controlled flight, and wherein the control system adapts the control system's coordination of the rotors based on the primary direction of thrust with respect to the fuselage.

5. The rotorcraft of claim 1, and further comprising a directional sensor sensing the external environment, wherein the control system adjusts a sensor signal from the directional sensor based on the primary direction of thrust with respect to the fuselage.

6. The rotorcraft of claim 5, and further comprising a ground station depicting a video signal from the directional sensor, wherein the ground station displays the video signal in an orientation based on the orientation of the fuselage with respect to gravity.

7. The rotorcraft of claim 1, wherein each rotor has a plurality of blades, and wherein each blade produces equal thrust in either direction of rotation at a given rotational speed.

8. The rotorcraft of claim 7, wherein each blade extends out from a rotor hub along a longitudinal blade axis, and wherein each blade has 2-fold rotational symmetry around that blade's longitudinal axis.

9. The rotorcraft of claim 7, wherein each rotor has a plurality of blades, and wherein at least one blade includes rigid sections at a leading edge and a trailing edge, and a flexible section intermediate the rigid sections, wherein the flexible section is adequately flexible to change in aerodynamic shape when the motors reverse the direction of rotor rotation.

10. The rotorcraft of claim 1, and further comprising a surface-connection device affixing the rotorcraft to a surface such that it hangs from the surface without rotor activity to maintain the rotorcraft's position.

11. The rotorcraft of claim 1, wherein each rotor has a plurality of blades, wherein each blade extends out from a rotor hub along a longitudinal blade axis, and wherein each blade rotates around that blade's longitudinal axis when the control system reverses the direction of thrust.

12. An aerial vehicle, comprising:
a body having by a right-side-up orientation and an upside-down orientation with respect to gravity;
one or more thrusters providing thrust in a primary direction of thrust with respect to the body;
a control system controlling the primary direction of thrust with respect to the body in which the one or more thrusters provides thrust; and
an orientation sensor sensing the orientation of the body with respect to gravity;
wherein the control system reverses the direction of thrust based on a signal from the orientation sensor that indicates the orientation of the body with respect to gravity has switched between the right-side-up orientation and the upside-down orientation.

\* \* \* \* \*